United States Patent [19]

Neumaier

[11] 3,875,502

[45] Apr. 1, 1975

[54] COIL ARRANGEMENT AND CIRCUIT FOR EDDY CURRENT TESTING

[75] Inventor: Peter Neumaier, Metzingen, Germany

[73] Assignee: Institut Dr. Friedrich Forster, Prufgeratebau, Reutlingen, Germany

[22] Filed: Mar. 13, 1974

[21] Appl. No.: 450,895

[30] Foreign Application Priority Data

May 24, 1973 Germany............................ 2326391

[52] U.S. Cl. ................................................ 324/37
[51] Int. Cl. ........................................... G01r 33/12
[58] Field of Search ................................ 324/37, 40

[56] References Cited
UNITED STATES PATENTS

| | | | |
|---|---|---|---|
| 3,743,928 | 7/1973 | Forster.................................. | 324/37 |
| 3,753,085 | 8/1973 | Morton et al.......................... | 324/37 |

Primary Examiner—Robert J. Corcoran
Attorney, Agent, or Firm—Ervin B. Steinberg

[57] ABSTRACT

An eddy current coil test arrangement comprises an excitation coil for producing over a portion of a workpiece to be tested for defects an alternating magnetic field which penetrates the workpiece in a direction perpendicular to the workpiece surface to cause eddy currents flowing parallel to the workpiece surface. A pair of sensing coils for detecting defects coupled electrically in opposition are disposed within the range of the magnetic field and have their axes oriented perpendicular to the direction of the alternating magnetic field. The spacing of the sensing coils along the direction of their coil axes is approximately twice the distance between the loci of the two maximum voltage signals occurring across the winding of one coil responsive to motion of the coil arrangement over the workpiece surface in the direction of the coil axes and passing over a defect extending transversely to the stated direction.

23 Claims, 11 Drawing Figures

COIL ARRANGEMENT AND CIRCUIT FOR EDDY CURRENT TESTING

BRIEF DESCRIPTION OF THE INVENTION

This invention relates to eddy current testing and more specifically to means for detecting defects in a workpiece by scanning the surface of such workpiece with a specific arrangement of eddy current test coils. Quite specifically, this invention concerns coil means for producing over a portion of the workpiece surface an alternating magnetic field which penetrates the workpiece in a direction perpendicular to the surface for generating in the workpiece eddy currents flowing parallel to the workpiece surface. A pair of sensing coils for detecting defects are disposed within the range of the magnetic field, have their coil axes oriented perpendicular to the direction of the alternating magnetic field and are coupled in electrical opposition. Most significantly, the sensing coils are spaced from each other in accordance with maxima of voltage signals appearing across one sensing coil when the coils are moved across a defect running transverse to the coil axes.

The use of electromagnetic coils for producing alternating magnetic fields for defect detection is known to those skilled in the art of eddy current testing. The heretofore known arrangements of test coils generally employ coplanar or coaxial excitation and sensing coil means. The novel arrangement disclosed hereafter in greater detail has the advantage that neither the primary magnetic field produced by the excitation coil nor the secondary magnetic field responsive to eddy currents generated in a defect-free workpiece portion transmit a magnetic flux to the sensing coil means. The sensing coil means does not receive a magnetic flux unless a defect in the workpiece surface in the vicinity of the test coils causes an anomaly of the eddy current path and such an anomaly, in turn, produces a secondary eddy current magnetic field having a component in the direction of the axis of the sensing coil means.

A principal advantage of the present arrangement resides in the fact that a carrier signal is present only when a defect is detected, whereas the prior arrangements require means to suppress the carrier signal in the absence of a defect. Frequently, the excitation and sensing coils are of an elongated shape to scan a surface strip of the workpiece, the length of the strip being approximately equal to the length of the coil arrangement. Using a plurality of such coil arrangements, it is possible to scan simultaneously the entire circumference of a cylindrical workpiece if the coil arrangement is shaped to conform to the curvature of the workpiece. Good results are achieved with an arrangement of this type if the defects are disposed transverse to the scan direction or have a component of sufficient magnitude in that direction. However, if the defect is disposed substantially in the longitudinal direction (in the scanning direction), the sensitivity of heretofore known arrangements frequently has been insufficient because the defect signal appearing across the sensing coil corresponded only to variations in the depth of the defect and not to the actual depth of the defect. This problem presents a serious drawback in the case when rolled stock, rolled in the axial direction, is tested. Determining the exact depth of a longitudinal defect which is prevalent in rolled stock is requisite of a defect detection system in order to assess the quality and suitability of such material for further processing.

A principal object of this invention, therefore, is the provision of an eddy current test coil arrangement which when moved over a defect extending in the scanning direction causes a signal whose amplitude is responsive to the depth of the defect and such signal remaining fairly constant over a certain amount of lateral displacement between the coil arrangement and the defect.

In accordance with the present invention the sensing coil means comprises at least two separate coils whose axes are oriented in a direction perpendicular to the scanning direction and perpendicular to the direction of the alternating magnetic field. The signals from respective sensing coils forming a pair are electrically coupled in a subtractive relation and the distance between the two sensing coils along their axes is approximately twice the distance between the loci of the 2 maximum voltages which would occur across one of the respective sensing coils when the coils moving in the direction of the coil axis pass over a transversely disposed defect. As will be explained in further detail hereinafter, the purpose of this invention is to produce responsive to a longitudinally oriented defect located between the pair of sensing coils a signal which is proportional to the depth of the particular defect. The amplitude of the defect signal will remain substantially constant despite a lateral displacement of the test coils in relation to a defect. In a particular embodiment of the present invention, a plurality of pairs of sensing coils are disposed in such a manner that test regions providing constant defect signal indication overlap each other.

In an alternative embodiment of this invention, the pairs of sensing coils are disposed in two rows to cause along each row spaced test regions providing constant defect signal amplitude alternated by regions not providing such signal amplitude. However, the sensing coils are so disposed along their respective rows that the workpiece regions not covered along one row are covered by the coils of the other row.

In accordance with a specific preferred embodient of this invention the outputs of the pairs of sensing coils are coupled sequentially to the input of a defect evaluation circuit by means of a time controlled electronic scanning device.

DETAILED DESCRIPTION OF THE INVENTION

Figure 1:
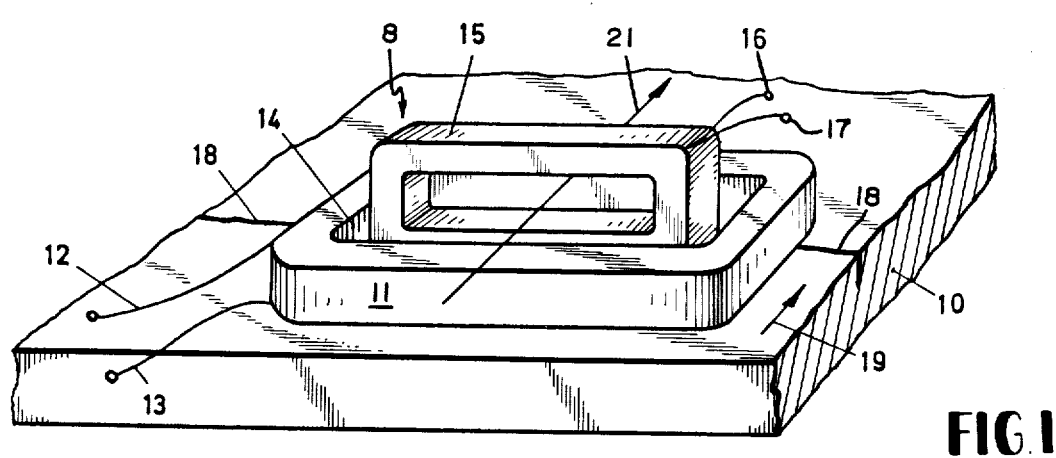
FIG. 1 is a perspective illustration of a known arrangement of test coils.

Referring now to the drawings and FIG. 1 in particular, a prior art test coil arrangement 8 is shown. The arrangement comprises a rectangular excitation coil 11 with conductors 12 and 13 for connecting the excitation coil 11 to a source of alternating current (not shown). A sensing coil 15 having terminals 16 and 17 is disposed in the rectangular aperture 14 of the excitation coil 11.

The sensing coil 15, FIG. 1, is disposed relative to the excitation coil 11 so that its coil axis 21 is perpendicular to the magnetic lines of force of the alternating magnetic field produced by the excitation coil 11. Accordingly, there is no electrical voltage across the terminals 16 and 17 of the sensing coil 15. The test coil arrangement 8 is positioned above and parallel to the surface of the workpiece 10 for causing the lines of force of the alternating magnetic field to penetrate into the workpiece 10 in a direction perpendicular to the surface. The paths of the eddy currents thereby induced in the workpiece 10 are parallel to the workpiece surface. Consequently, the secondary magnetic fields of the eddy currents are in a direction perpendicular to the workpiece surface and fail to produce a voltage across the terminals 16 and 17 of sensing coil 15 as long as the eddy current paths remain undisturbed, i.e. no defects are present.

An anomaly in the workpiece surface will cause a component of the secondary eddy current magnetic field to be disposed in the direction of the axis 21 of the sensing coil 15. Hence, if the test coil arrangement 8 is moved in the direction indicated by arrow 19 over a crack 18, a voltage signal is produced across the terminals 16 and 17 of the sensing coil 15. The amplitude of the signal will be proportional to the depth of the crack if the crack extends over the entire length of the test coil. A crack extending in the direction of coil movement, referred to as a longitudinal crack, will produce a voltage across the sensing coil terminals 16 and 17 only when the coil arrangement passes over the beginning and the end of the crack. If the coils are disposed completely above a longitudinal crack, the components of the secondary eddy current magnetic fields in the direction of the coil axis 21 cancel each other. Only variations in the depth of longitudinal cracks cause defect responsive signals whose amplitudes correspond to the amount of such variations.

It follows therefore that for longitudinal defects, because of the elongated coil shape, a defect responsive signal of constant amplitude is produced over a certain lateral range, but that this signal is not proportional to the absolute depth of the defect.

Figure 2:
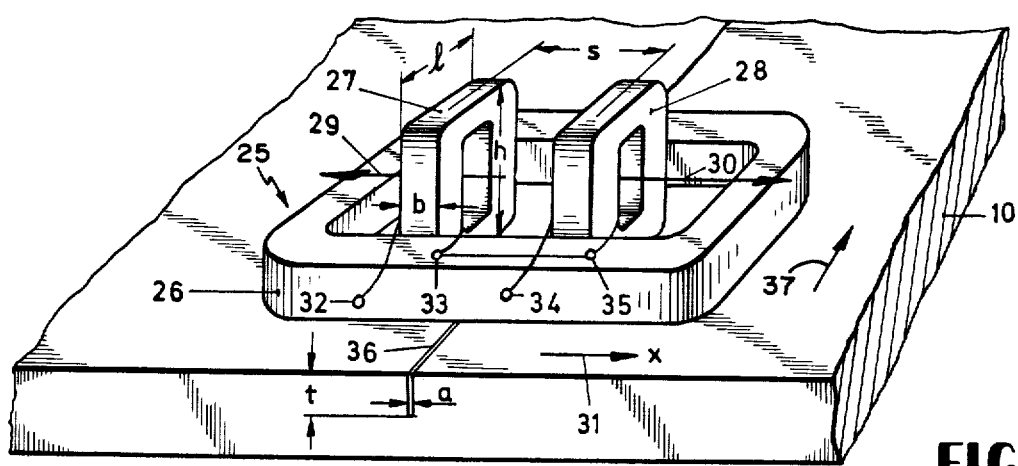
FIG. 2 is a perspective view of a preferred embodiment of the present invention.

Referring now to FIG. 2, there is shown an embodiment forming the present invention. The coil arrangement 25 comprises an excitation coil 26 and two sensing coils 27 and 28. The lines of magnetic force of the alternating magnetic field produced by the excitation coil 26, like those produced in the prior art arrangement, will be generally in a direction perpendicular to the surface of the workpiece 10. The excitation coil 26 is disposed parallel to the workpiece surface to assure that the lines of force will be perpendicular to the workpiece surface. The two sensing coils 27 and 28 are oriented in relation to the excitation coil 26 so that their coil axes 29 and 30, both being in the direction X indicated by the arrow 31, are perpendicular to the lines of force of the alternating magnetic field produced by the excitation coil 26. As a result thereof, no signal voltage will appear at the terminal pairs 32, 33 and 34, 35 of the respective sensing coils 27 and 28, as long as the coil arrangement 25 is located above a defect-free zone of the workpiece 10. The spacing between the two sensing coils 27 and 28 is selected using considerations which will be described in the following paragraphs.

Figure 3A:
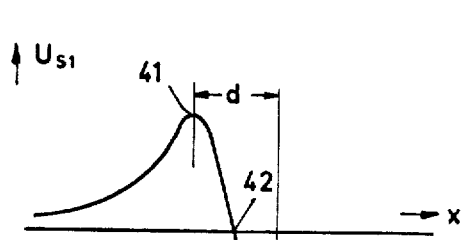
FIGS. 3a, 3b, 3c and 3d are graphical representations of the defect signal characteristics applicable to the embodiment per FIG. 2.

FIG. 3a is a representation of the signal voltage $U_{s1}$ appearing across the terminals 32, 33 when the sensing coil 27 passes in the X-direction, arrow 31, over a crack 36 having the depth $t$ and width $a$. The crack 36, FIG. 2, is a longitudinal crack, i.e. a crack extending in the general direction of the movement of the test coil arrangement 25 relative to the workpiece as is indicated by the arrow 37. To simplify the representation, only the envelope of the alternating voltage signal is shown, that is, the voltage obtained after demodulation of the alternating voltage signal in proper phase relation. Prior to the sensing coil 27 reaching the crack 36, a peak positive voltage 41 is obtained. A zero crossing 42 occurs when the sensing coil 27 is positioned directly above the crack 36. A peak negative voltage 43 equal in magnitude to the positive peak 41 is obtained after the sensing coil 27 has passed over crack 36. The two maxima 41 and 43, are equally spaced from the zero crossover at 42 and the separation between peaks 41 and 43 is the distance d along the X-axis. The amplitude of the maxima is largely a function of the depth $t$ of the crack 36.

It has been found that the shape of the signal $U_{s1}$ and particularly the distance $d$ between the two maxima 41 and 43 is essentially a function of the characteristics of the magnetic field induced by the eddy currents in the vicinity of the longitudinal crack 36. The dimensions of the sensing coils 27 and 28 have only a small effect upon the shape of the signal $U_{s1}$. The coil length $l$ as expected has no effect; the width $b$ of the coil has no effect as long as this width is small in comparison to the coil spacing $s$, and the coil height h has no effect above a predetermined minimum height. If the height h is below the minimum, the two peaks 41 and 43 diminish. Moreover, the vertical spacing of the sensing coil 27 above the surface of the workpiece within a large range has no significant effect upon the characteristics of the shape of the signal voltage $U_{s1}$.

When testing non-ferrous metals, the secondary eddy current magnetic fields, which determine the characteristic of the signal voltage $U_{s1}$, are only slightly dependent upon the conductivity of the workpiece 10 and upon the frequency of the alternating magnetic field.

When testing ferromagnetic workpieces, the relative permeability of the material causes the distance between the two peaks 41 and 43 to become approximately twice of that measured with non-ferrous workpieces. The depth of the longitudinal crack 36 has almost no effect upon the shape of the secondary eddy current magnetic fields within the range of defect depth normally of interest. An increase in the width of a longitudinal crack causes an increase in the distance $d$, the amount of the increase being approximately equal to the change in crack width. Since the width a of the crack, under normal conditions, is small, the distance $d$ between the maxima 41 and 43 may be assumed to remain constant over a wide range of applications.

Figure 3B:
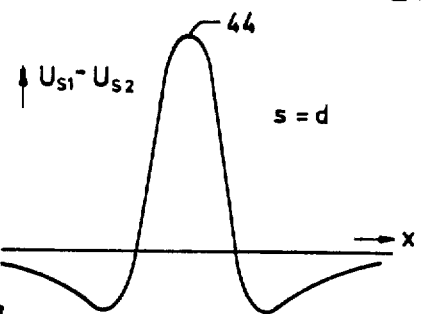

Across the sensing coil 28, which physically is identical with the sensing coil 27, a signal voltage $U_{s2}$ is produced which is identical in amplitude and shape to the signal $U_{s1}$ across the coil 27. If the sensing coils 27 and 28 are connected in a voltage subtractive relation, i.e. connecting terminals 33 and 35 to each other, the resultant signal across the other two conductors 32 and 34 will be equal to the difference signal $U_{s1} - U_{s2}$ whose shape is significantly affected by the spacing s existing between the sensing coils 27 and 28. FIG. 3b shows the difference signal across the terminals 32 and 34 for the condition when the spacing s is equal to the distance d between the maxima 41 and 43. In this case, the two positive peaks coincide and a new higher peak 44 is obtained.

Figure 3C:
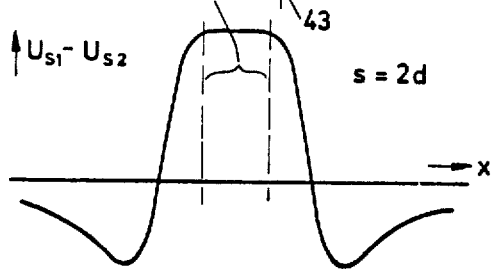

FIG. 3c illustrates the shape of the difference signal for the case when the spacing s equals the distance 2d. In this case, a wide region 45 of constant signal amplitude is obtained instead of a peak, the region 45 corresponding to the distance within which the test coil arrangement 25 may be physically displaced in the X-direction relative to the crack 36 without causing a change in the defect signal amplitude at the sensing coils. Therefore, it can be concluded that if a coil arrangement 26 with coil spacing s equal to 2d is moved in the direction of arrow 37 over a crack 36, a defect signal is obtained at terminals 32 and 34, and that the amplitude of the signal is proportional to the depth of the crack 36 and independent of the lateral displacement of the crack relative to the coil arrangement 25 within the constant amplitude region 45. This aforementioned result is the primary object of the present invention. It will be apparent that the sensing coils are secured in place relative to each other and the excitation coil by taping or suitable spacers as is well known in the art.

Figure 3D:
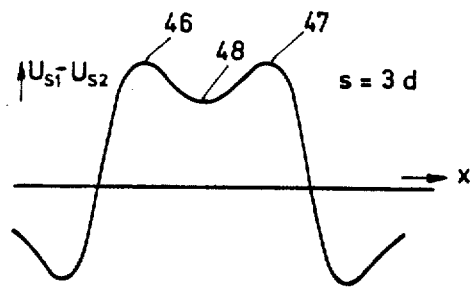

FIG. 3d shows the signal shape if the spacing s equals 3d. In this instance, two individual peaks 46 and 47 are separated by an intermediate dip 48. In accordance with this invention, embodiments whose coil spacings cause defect signals as shown in FIG. 3b and FIG. 3d fail to provide the desired result since in both instances a region of constant defect signal amplitude is not obtained.

Figure 4:
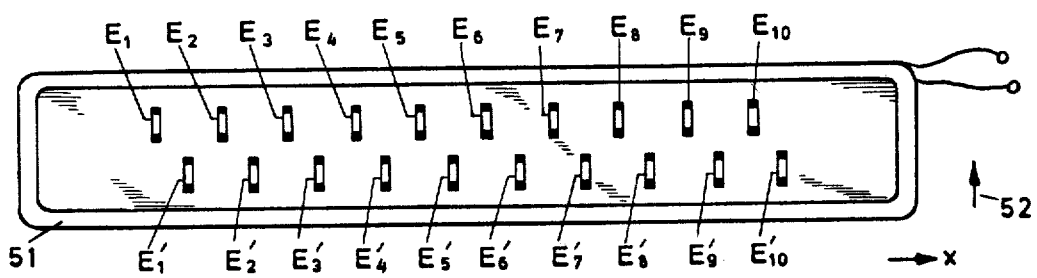
FIG. 4 is a plan view of an arrangement of test coils with two rows of sensing coils.

A test coil embodiment as shown in FIG. 4 can be employed for scanning a large surface area for defects leaving no gaps. Within the magnetic field generated by the rectangularly shaped excitation coil 51, there are disposed two rows of sensing coils $E_1$ through $E_{10}$ and $E'_1$ through $E'_{10}$. The coils are disposed such that the spacing s between two adjacent coils equals the distance 2d, and the coils of a respective row are located in corresponding gaps of the other row, that is, providing a staggered array of coil rows.

Figure 5:
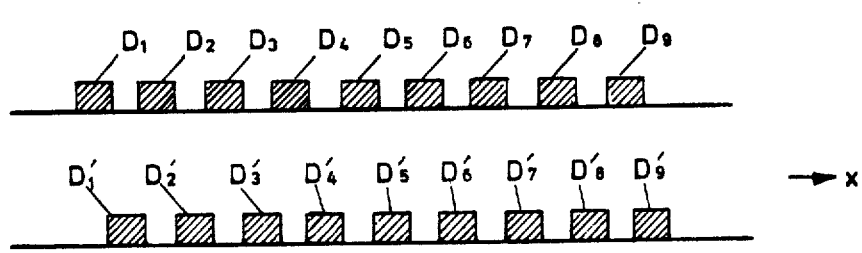
FIG. 5 is an illustration for explaining the constant defect signal amplitude regions when using the sensing coil arrangement shown in FIG. 4.

As described and illustrated in FIG. 2, the axes of the sensing coils are oriented to be perpendicular to the magnetic lines of force of the magnetic field of the excitation coil 51 and normal to the direction of motion as is indicated by the arrow 52. In both rows, two juxtaposed sensing coils, i.e. $E_1$ and $E_2$, $E_3$ and $E_4$ etc., are always connected in a voltage subtractive relation. Therefore, as shown in FIG. 5, the scan regions $D_1$ through $D_9$ and $D'_1$ through $D'_9$ have the same sensitivity to defects disposed in the X-direction, the region $D_1$ being related to the coil pair $E_1$ and $E_2$, the region $D_2$ being related to the coil pair $E_2$ and $E_3$, etc. The gaps between the regions of the upper row are so covered by the regions of the lower row that as a composite adjacent regions of the two rows overlap. Therefore, the workpiece surface disposed between the coils $E_1$ and $E'_{10}$ is scanned without gap in the direction of the arrow 52.

Figure 6:
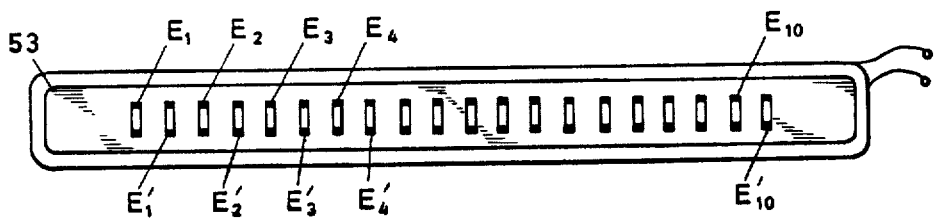
FIG. 6 is a plan view of an alternative arrangement of test coils with one row of sensing coils.

An alternative embodiment is shown in FIG. 6 in which the sensing coils $E_1$ through $E_{10}$ and $E'_1$ through $E'_{10}$ are disposed in a single row within the magnetic field produced by the excitation coil 53. The interconnections between the coils are identical with those described hereinabove.

Figure 7:
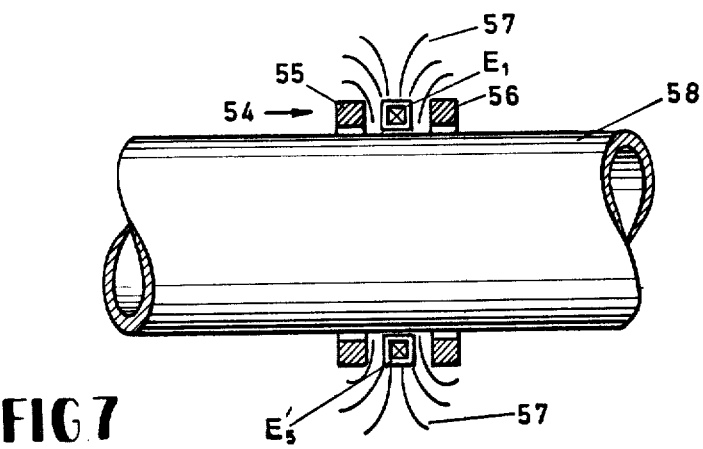
FIG. 7 is an arrangement of test coils for testing workpieces of cylindrical cross-section.

Another alternative embodiment for testing tubular workpieces is illustrated in FIG. 7. The test coil arrangement 54 can be used to scan the entire surface of a workpiece 58. The sensing coils $E_1$ through $E'_{10}$ of which only $E_1$ and $E'_5$ are shown, are distributed about the circumference of the workpiece 58. The coils $E_1$ and $E_2$ and $E_3$, etc. through $E_{10}$ and $E_1$ and the coils $E'_1$ and $E'_2$ and $E'_3$ respectively through $E'_{10}$ and $E'_1$, are connected in pairs such that two closed rings of coil pairs are formed.

In this latter embodiment, the exciting magnetic field is produced by two annular excitation coils 55 and 56, shown in section, connected in series opposition. Alternating current flowing through the excitation coils 55 and 56 produces a magnetic field with lines of force 57.

Defect Evaluating Circuit

Figure 8:
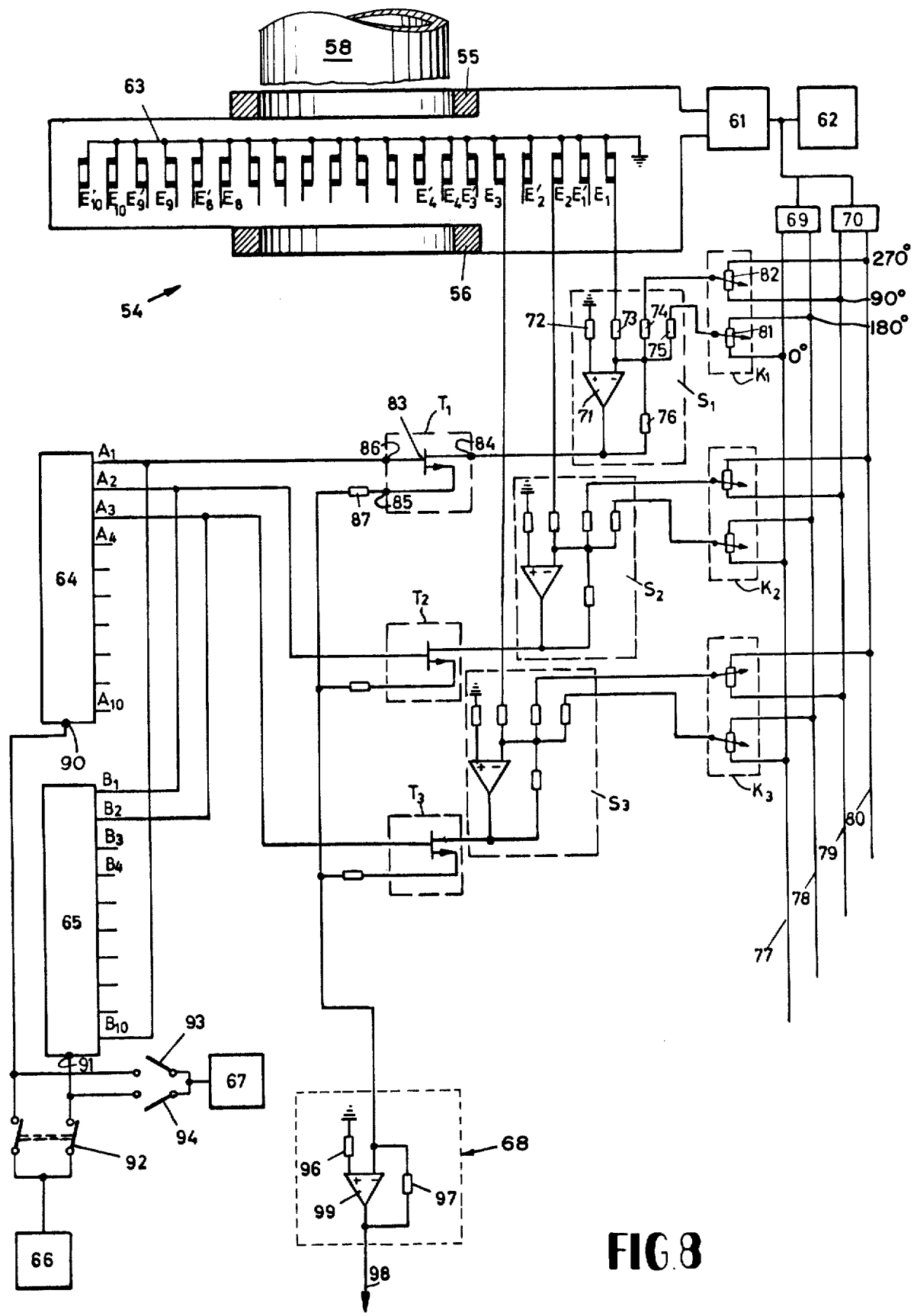
FIG. 8 is a schematic electrical circuit diagram for processing the output signals from the test coils shown in FIGS. 6 and 7.

A preferred embodiment of a defect evaluating circuit for use in accordance with the present invention is shown in FIG. 8. The output signals derived from two sets of sensing coils are continuously and sequentially electronically scanned and the signals are fed to a suitable channel of the evaluation circuit. The test coil arrangement 54 is similar to that shown in FIG. 7. The two excitation coils 55 and 56 are connected so that the start of one coil is connected to the finish of the other to provide a series opposition connection. The two remaining terminals are connected to an electrical oscillator 62 via a power amplifier 61.

Two sets of sensing coils $E_1$ through $E_{10}$ and $E'_1$ through $E'_{10}$, shown in one plane in FIG. 8 for the sake of simplicity, are disposed about the circumference of the workpiece 58 as is indicated in FIG. 7. The sensing coil of one set of coils is located adjacent to the sensing coil of the other set of coils so that at the end coils $E_1$ and $E'_{10}$ are adjacent to each other. As explained previously, the distance between two successive coils forming a pair (i.e. $E_1$ and $E_2$ and $E'_1$ and $E'_2$) is twice the distance (2d) of the associated signal voltage maxima. The sensing coils have one end of their winding connected to ground by means of conductor 63. The other coil terminations are connected to the evaluation circuit for continuous electronic scanning of pairs of adjacent sensing coils. For the sake of simplicity, the scanning process is described for the set of sensing coils comprising coils $E_1$ through $E_{10}$ and only the three coils $E_1$, $E_2$ and $E_3$ are more fully explained. Identical circuits are used for the sensing coils comprising the set of coils $E'_1$ through $E'_{10}$.

The outputs of the sensing coils $E_1$ through $E_{10}$ are connected to summation amplifiers $S_1$ through $S_{10}$ (only $S_1$ to $S_3$ shown), and the outputs from the summation amplifiers are provided to gate circuits $T_1$ through $T_{10}$ (only $T_1$ through $T_3$ shown). Two ring counters 64 and 65, receiving timing pulses from either a timing pulse generator 66 or a manual timer 67, control the gate circuits so that pairs of adjacent gate circuits are sequentially turned "ON" i.e. first $T_1$ and $T_2$, then $T_2$ and $T_3$, then $T_3$ and $T_4$, etc. The outputs of the gate circuits are applied to the input of an evaluation means 68 so that for each timing pulse the amplified output signal of another pair of adjacent sensing coils is connected to the input of evaluation means 68. The output signal from evaluation means 68 indicative of a defect is further processed by means known to those skilled in the art.

Since any residual voltage of an unbalanced sensing coil would cause a signal at the output conductor 98 of the evaluation means 68 during its ON time, each sensing coil must be carefully balanced. Compensation for any residual voltage is provided by compensating means $K_1$ through $K_{10}$, adjustable resistors, connected to the sensing coils and receiving voltages from voltage sources 69 and 70. One again, only $K_1$ through $K_3$ have been shown.

The scanning circuit will now be explained in greater detail. The summation amplifiers $S_1$ through $S_{10}$ comprise principally an operational amplifier 71 and resistors 72, 73, 74, 75 and 76. The resistors 73, 74 and 75 which may be of equal magnitude are connected with one end each to the summing junction of the operational amplifier 71. The other side of resistor 73 is connected to the output of sensing coil $E_1$, and the other side of resistors 74 and 75 is connected to the compensating means $K_1$. The compensating means $K_1$ is coupled to two voltage outputs 90 electrical degrees out of phase with each other. Feedback resistor 76 is connected from the output of the operational amplifier 71 to the summing junction and determines, responsive to the value of the resistors 73, 74 and 75, the gain of the signal voltage and the compensating means voltage. The two compensating voltage sources 69 and 70 are coupled to the output side of the oscillator 62. The voltage sources 69 and 70 provide to conductors 77 and 78 a voltage signal in phase with the signal from oscillator 62 and a voltage signal 180 electrical degrees shifted with respect to the phase of the oscillator signal, and to conductors 79 and 80 a signal shifted 90 electrical degrees and a signal shifted 270 electrical degrees with respect to the phase of the oscillator signal. The conductors 77 and 78 are connected to the ends of potentiometer 81, and the conductors 79 and 80 are connected to the ends of a potentiometer 82 of the compensating means $K_1$. The wiper arms of the potentiometers 81 and 82 can be positioned for any voltage having a phase shift from 0 and 90 electrical degrees, or beyond the center position a phase reversal to 180 and 270 degrees for zeroizing any residual voltage appearing at the output side of the summation amplifier $S_1$ responsive to a residual voltage signal of a given phase angle appearing at sensing coil $E_1$. The output of the summation amplifier $S_1$ is connected to the control input 84 of the gate circuit $T_1$. The gate circuit $T_1$ comprises principally a field effect transistor 83 whose output 85 for all practical purposes is directly connected to the input at terminal 84 when a positive voltage exists at control input 86. The summation amplifiers $S_2$ through $S_{10}$ and compensating means $K_2$ to $K_{10}$ are of identical construction and connected as explained in conjunction with $T_1$, $S_1$ and $K_1$. The output signal appearing at junction 85 is connected via resistor 87 to the evaluation means 68. Similarly, the other gate circuits $T_2$, $T_3$ etc. are connected via respective resistors to the same input of the evaluation means 68.

The ring counters 64 and 65 have counting outputs $A_1$ through $A_{10}$ and $B_1$ through $B_{10}$ respectively and receive timing input signals at terminals 90 and 91. The counting outputs are connected to the respective control inputs of the gate circuits $T_1$ through $T_{10}$. The timing pulses from the timing pulse generator 66 are applied to the inputs 90 and 91 of the ring counters via the double pole switch 92. The frequency of the timing pulse generator 66 determines the scan rate applied to the sensing coils $E_1$ through $E_{10}$. Each timing pulse changes the high level output of the ring counter to the next output wire, i.e. from $A_1$ to $A_2$ to $A_3$, etc. and from $B_1$ to $B_2$ to $B_3$, etc. The process continues until the high state outputs are $A_{10}$ and $B_{10}$, then with the next occurrence of a timing pulse the ring counter high state outputs become $A_1$ and $B_1$. The process will continue for as long as there are timing pulses. The high level outputs of the ring counters are applied to the inputs of a pair of successive gate circuits for the duration of one timing pulse. Consequently, gate pairs $T_1$ and $T_2$, and $T_3$, ... $T_{10}$ and $T_1$, $T_1$ and $T_2$, etc. are sequentially ON whereby the signal voltages of two juxtaposed sensing coils of the same set of coils are combined with each other to provide the difference signal $U_{S1} - U_{S2}$ at the input of the evaluation means 68. Thus, signal voltages corresponding to a sequence of scanning regions as shown in the upper part of FIG. 5 are available at the output 98 of the evaluation means 68. The evaluation means 68 comprises an operational amplifier 99 and two resistors 96 and 97. As mentioned previously, an identical circuit comprising summation amplifiers, gates and a pair of time controlled ring counters is provided for the receiver coils $E'_1$ through $E'_{10}$ which terminate in a second evaluation means identical to the evaluation means 68. The output signal voltages from this second evaluation means are used for monitoring the scanned regions corresponding to the lower part of FIG. 5. Hence, the entire surface of the workpiece 58 can be scanned without gaps for defects while producing signals responsive to longitudinal defects, the signals being commensurate with the depth of such defects.

To compensate for residual voltages across the sensing coils, the timing pulse generator 66 can be disconnected from the circuit by means of switch 92. A sequence of timing pulses causing only one of the gate circuits $T_1$ through $T_{10}$ to be ON can be applied via the manually operable timer 67 and switches 93 and 94. In this manner, a single sensing coil is connected to the output 98, and the residual voltage of such sensing coil can then be zeroized by adjusting the wiper arms of the respective compensating potentiometers 81 and 82.

The remaining gate circuits $T_2$ through $T_{10}$, summation amplifiers $S_2$ through $S_{10}$, and compensating means $K_2$ through $K_{10}$, are constructed and interconnected as described above with reference to $T_1$, $S_1$ and $K_1$.

Alignment of the Coils

In order to determine the spacing $s$ between the pair of sensing coils, shown in FIG. 2, an alignment procedure is employed as explained hereinafter. A single sensing coil, similar to those used in the test arrangement, is moved along the surface of a metallic workpiece containing a crack which extends perpendicular to the direction of motion and perpendicular to the coil axis. The sensing coil terminals are connected to a measuring circuit which includes a cathode ray tube. The distance $d$ is determined by measuring the distance from the point whereat a first maximum 41 (see FIG. 3a) occurs to a second point whereat a maximum 43 occurs. The spacing s is twice the distance d. During the alignment procedure the excitation coil 26 (see FIG. 2) may remain stationary or be moved as the sensing coil is displaced relative to the crack. Although the distance d is relatively independent of the crack depth t, for best results, it is advantageous to select a crack of sufficient depth to assure a signal of large amplitude on the cathode ray tube screen for accurate spacing of the sensing coils. The above mentioned alignment procedure is performed prior to initiation of any eddy current defect detection testing.

While there has been described and illustrated a certain preferred embodiment of the present invention together with several alternative embodiments, it will be apparent to those skilled in the art that further variations and modifications can be made without departing from the broad principle and spirit of this invention which shall be limited only by the scope of the appended claims.

What is claimed is:

1. An arrangement of test coils for scanning for defects the surface of a metallic workpiece moving in a predetermined direction relative to said arrangement of test coils comprising:
   excitation coil means adapted to be coupled to the surface of the metallic workpiece and responsive to being energized with alternating current producing a homogeneous alternating magnetic field over at least a portion of said surface, said alternating magnetic field having lines of force which penetrate said surface substantially perpendicularly and cause the flow of eddy currents in the workpiece;
   sensing coil means including at least a pair of spaced substantially identical sensing coils coupled electrically in a voltage subtractive relation disposed within the range of said alternating magnetic field in proximity to said surface, said sensing coils having their coil axes oriented in a direction substantially perpendicular to said predetermined direction and substantially perpendicular to the direction of said lines of force, and
   the spacing between said sensing coils along the direction of their coil axes being adjusted to be approximately equal to twice the distance between the loci of the two maximum voltage signals occurring across the winding of one of the sensing coils responsive to the existence of said eddy currents and relative motion between said one sensing coil and said workpiece surface in the direction of said coil axes and said one sensing coil passing over a defect extending substantially transverse to said sensing coil axes,
   whereby to provide responsive to energizing said excitation coil means and said sensing coils passing over such a defect in said predetermined direction an output signal across the terminals of the sensing coil means forming said pair.

2. An arrangement of test coils for scanning for defects the surface of a metallic workpiece as set forth in claim 1, said excitation coil means comprising two annular excitation coils coupled in series opposition and being dimensioned to fit over the outside of a cylindrical workpiece.

3. An arrangement of test coils for scanning for defects the surface of a metallic workpiece as set forth in claim 1, said sensing coil means comprising pairs of coils disposed in two parallel rows, and coils forming a respective pair being disposed in the same row.

4. An arrangement of test coils for scanning for defects the surface of a metallic workpiece as set forth in claim 3, the individual coils in one of said rows being spaced axially with respect to the coils in said other row to cause said coils in one row to be staggered with respect to the coils in said other row.

5. An arrangement of test coils for scanning for defects the surface of a metallic workpiece as set forth in claim 4, said coils being spaced relative to one another to provide an overlapping pattern of scanned regions responsive to motion in said predetermined direction exposing successively portions of the workpiece to said sensing coils.

6. An arrangement of tests coils for scanning for defects the surface of a metallic workpiece moving in a predetermined direction relative to said arrangement of test coils comprising:
   excitation coil means adapted to be coupled to the surface of the metallic workpiece and responsive to being energized with alternating current producing a homogeneous alternating magnetic field over at least a portion of said surface, said alternating magnetic field having lines of force which penetrate said surface substantially perpendicularly and cause the flow of eddy currents in the workpiece;
   sensing coil means including at least a pair of spaced substantially indentical sensing coils coupled electrically in a voltage subtractive relation disposed within the range of said alternating magnetic field in proximity to said surface, said sensing coils having their coil axes oriented in a direction substantially perpendicular to said predetermined direction and substantially perpendicular to the direction of said lines of force;
   the spacing between the sensing coils along the direction of their coil axes being adjusted to be approximately equal to twice the distance between the loci of the two maximum voltage signals occurring across the winding of one of said sensing coils responsive to the existence of said eddy currents and relative motion between said one sensing coil and said workpiece surface in the direction of said coil axes and said one sensing coil passing over a defect extending substantially transverse to the direction of said sensing coil axes;
   scanning means coupled to said sensing coil means for processing an output signal from said sensing coil means produced responsive to energizing said excitation coil means and said coil arrangement passing over a defect in said predetermined direction, and
   evaluation means coupled to said scanning means for receiving said output signal.

7. An arrangement of test coils for scanning for defects the surface of a metallic workpiece as set forth in claim 6, said scanning means including:
   a time controlled gate circuit means coupled in circuit with each of said sensing coils and to said evaluation means;
   ring counter means coupled to said gate circuit means for time controlling said gate circuit means to couple successive output signals from respective pairs of sensing coils to said evaluation means, and timing pulse generator means coupled to said ring counter means for sequentially and cyclically operating said gate circuit means.

8. An arrangement of test coils for scanning for defects the surface of a metallic workpiece as set forth in claim 7, said sensing coil means comprising a plurality of coils disposed in a row; said ring counter means comprising a pair of counters, and said timing pulse generator means operating said ring counter means to cause said gate circuit means to sequentially couple the output signal from two sensing coils forming a respective pair successively in timed sequence to said evaluation means.

9. An arrangement of test coils for scanning for defects the surface of a metallic workpiece as set forth in claim 6, and compensating means coupled to said sensing coil means for balancing residual voltage signals appearing across a respective pair of sensing coils in the absence of a defect.

10. An arrangement of test coils for scanning for defects the surface of a metallic workpiece as set forth in claim 9, said compensating means including means for providing signals in phase and signals out of phase with respect to the alternating current, and adjustable means coupled between said sensing coils and said means for providing said signals in phase and out of phase.

11. An arrangement of test coils for scanning for defects the surface of a metallic workpiece as set forth in claim 10, including switching means coupled in circuit between said timing pulse generator means and said ring counter means to selectively disconnect said timing pulse generator means from said ring counter means to provide a time interval for balancing residual voltage signals appearing across a respective pair of sensing coils, and manually operable timing means adapted to be coupled to said ring counter means for advancing said ring counter means when said pulse generator means is disconnected from said ring counter means.

12. An arrangement of test coils for scanning for defects the surface of a metallic workpiece moving in a predetermined direction relative to said arrangement of test coils comprising:
   a substantially rectangular apertured excitation coil adapted to be coupled to the surface of the metallic workpiece and responsive to being energized with alternating current producing a magnetic field over at least a portion of said surface, said magnetic field having lines of force which penetrate said surface substantially perpendicularly and cause the flow of eddy currents in the workpiece;
   sensing coil means comprising a plurality of spaced substantially identical sensing coils disposed in the aperture of said excitation coil within the range of said alternating magnetic field in proximity to said surface, said sensing coils having their coil axes oriented in a direction substantially perpendicular to said predetermined direction and substantially perpendicular to the direction of said lines of force;
   means for causing said sensing coils to be electrically paired and the coils of each pair coupled electrically in a voltage subtractive relation;
   the spacing between the sensing coils forming a respective pair being adjusted to be approximately equal to twice the distance between the loci of the two maximum voltage signals occurring across the winding of one of the sensing coils of said respective pair responsive to the existence of said eddy currents and relative motion between said one sensing coil and said workpiece surface in the direction of said sensing coil axes and said one coil passing over a defect extending substantially transverse to the direction of said sensing coil axes;
   means for energizing said excitation coil with alternating current, and
   an evaluating circuit coupled to said sensing coil means for receiving defect responsive signals from said respective pairs of sensing coils in response to said means for energizing causing said excitation coil to produce said field and said coil arrangement passing in said predetermined direction over a defect.

13. An arrangement of test coils for scanning for defects the surface of a metallic workpiece as set forth in claim 12, said sensing coils being disposed in a single row and forming two groups causing a coil belonging to one group to be in juxtaposition with a coil belonging to the other group, and said means for causing said sensing coils to be paired coupling respective coils belonging to the same group in said subtractive relation, whereby to provide a gap-free pattern of test regions for the workpiece surface extending along said row of sensing coils.

14. An arrangement of test coils for scanning for defects the surface of a metallic workpiece as set forth in claim 12, said sensing coils being disposed in two substantially parallel rows and the coils forming one row being in a staggered position with respect to the coils forming the other row, and said means for causing said sensing coils to be paired coupling the respective coils belonging to the same row in said subtractive relation, whereby to provide a gap-free pattern of test regions for the workpiece surface portion moving relative said arrangement of test coils.

15. An arrangement of test coils for scanning for defects the surface of a cylindrical metallic workpiece moving axially in a predetermined direction relative to said arrangement of test coils comprising:
   a pair of axially spaced substantially identical excitation coils adapted to fit over the workpiece coupled electrically in series opposition and responsive to being energized with alternating current producing a homogeneous alternating magnetic field over at least a portion of the cylindrical surface of the workpiece, said alternating magnetic field having lines of force which penetrate said surface portion substantially perpendicularly and cause the flow of eddy currents in the workpiece;
   sensing coil means comprising a plurality of spaced substantially identical sensing coils disposed circumferentially spaced about the workpiece in the space between said excitation coils within the range of said alternating magnetic field in proximity to said surface, said sensing coils having their coil axes in a direction substantially perpendicular to said predetermined direction and substantially perpendicular to said lines of force;
   means for causing said sensing coils to be electrically paired and the coils of each pair coupled electrically in a voltage subtractive relation;
   the spacing between the sensing coils forming a respective pair being adjusted to be approximately equal to twice the distance between the loci of the two maximum voltage signals across the winding of one of said sensing coils of said respective pair responsive to the existence of said eddy currents and relative motion between said one sensing coil and said workpiece surface in the axial direction of said one sensing coil and said one sensing coil passing over a defect extending substantially axially in said surface;

means for energizing said excitation coils with alternating current, and an evaluating circuit coupled to said sensing coil means for receiving defect responsive signals from said respective pairs of sensing coils in response to said means for energizing causing said excitation coils to produce said field and said coil arrangement passing over such a defect.

16. An arrangement of test coils for scanning for defects the surface of a workpiece as set forth in claim 15, said sensing coils forming a ring comprising two groups of sensing coils arranged to cause a coil belonging to one group to be in juxtaposition with a coil belonging to the other group, and said means for causing said sensing coils to be paired coupling respective coils belonging to the same group in said subtractive relation whereby to provide a gap-free pattern of test regions for the workpiece surface disposed opposite said ring of sensing coils.

17. The method of scanning for defects the surface of a metallic workpiece moving in a predetermined direction relative to an arrangement of test coils comprising:

producing a homogeneous alternating magnetic field over at least a portion of the surface of the workpiece, said alternating magnetic field having lines of force which penetrate said surface substantially perpendicularly and cause the flow of eddy currents in the workpiece;

disposing at least a pair of spaced substantially identical sensing coils coupled electrically in a voltage subtractive relation within the range of said alternating magnetic field in proximity to said surface, the axes of said sensing coils being oriented substantially perpendicular to said predetermined direction and substantially perpendicular to the direction of said lines of force, and adjusting the spacing between said sensing coils along the direction of their coil axes to be approximately equal to twice the distance between said loci of the two maximum voltage signals occurring across the winding of one of said sensing coils responsive to the existence of said eddy currenrs and relative motion between said one sensing coil and said workpiece surface in the direction of said coil axes and said one sensing coil passing over a defect extending substantially transverse to said sensing coil axes, and providing relative motion between said sensing coils and said workpiece surface in said predetermined direction to cause an output signal across the windings of said sensing coils in response to said sensing coils passing over a defect extending substantially transverse to said sensing coil axes.

18. The method of scanning for defects the surface of a metallic workpiece as set forth in claim 17, producing said alternating magnetic field including an electromagnetic coil means and energizing said electromagnetic coil means with alternating current.

19. The method of scanning for defects the surface of a metallic workpiece as set forth in claim 18, said electromagnetic coil means being apertured and said sensing coils being disposed in the aperture of said electromagnetic coil means.

20. The method of scanning for defects the surface of a metallic workpiece as set forth in claim 18, said electromagnetic coil means comprising two annular coils coupled in series opposition and dimensioned to fit over the outside of a cylindrical workpiece.

21. The method of scanning for defects the surface of a metallic workpiece as set forth in claim 17, and providing an electrical signal for balancing a residual signal appearing across said sensing coils in the absence of a defect.

22. The method of scanning for defects the surface of a metallic workpiece as set forth in claim 21, and coupling said output signal to an evaluating circuit.

23. The method of scanning for defects the surface of a metallic workpiece as set forth in claim 17, disposing a plurality of pairs of sensing coils within the range of said magnetic field and spacing the individual coils for providing a gap-free pattern of test regions along the workpiece surface portion under test.

* * * * *